US011898706B2

(12) United States Patent
Athalye

(10) Patent No.: US 11,898,706 B2
(45) Date of Patent: Feb. 13, 2024

(54) ILLUMINATING DEVICE

(71) Applicant: Praneet Jayant Athalye, Apex, NC (US)

(72) Inventor: Praneet Jayant Athalye, Apex, NC (US)

(73) Assignee: Buck Boost, LLC, Apex, NC (US)

(*) Notice: Subject to any disclaimer, the term of this patent is extended or adjusted under 35 U.S.C. 154(b) by 0 days.

(21) Appl. No.: 17/107,946

(22) Filed: Nov. 30, 2020

(65) Prior Publication Data

US 2021/0080064 A1 Mar. 18, 2021

Related U.S. Application Data

(63) Continuation of application No. 15/860,629, filed on Jan. 2, 2018, now Pat. No. 10,851,949.

(51) Int. Cl.

| | |
|---|---|
| ***F21K 9/232*** | (2016.01) |
| ***F21V 19/00*** | (2006.01) |
| ***F21V 29/83*** | (2015.01) |
| *F21Y 115/10* | (2016.01) |
| *F21V 23/06* | (2006.01) |
| *F21K 9/68* | (2016.01) |
| *F21Y 107/60* | (2016.01) |

(52) U.S. Cl.

CPC ............ *F21K 9/232* (2016.08); *F21V 19/003* (2013.01); *F21V 29/83* (2015.01); *F21K 9/68* (2016.08); *F21V 23/06* (2013.01); *F21Y 2107/60* (2016.08); *F21Y 2115/10* (2016.08)

(58) Field of Classification Search

CPC ............. F21Y 2107/60; F21Y 2107/50; F21Y 2107/90; F21K 9/27; F21K 9/232; F21K 9/66

See application file for complete search history.

(56) References Cited

U.S. PATENT DOCUMENTS

| | | | | | |
|---|---|---|---|---|---|
| 3,721,814 | A * | 3/1973 | Ries | D26/26 | |
| 5,749,646 | A * | 5/1998 | Brittell | F21K 9/23 | 362/240 |
| 5,806,965 | A * | 9/1998 | Deese | H05B 45/00 | 362/249.04 |
| 8,545,052 | B2 * | 10/2013 | Hu | F21K 9/232 | 362/249.02 |
| 2011/0248618 | A1 * | 10/2011 | Gielen | F21K 9/64 | 313/46 |
| 2014/0009936 | A1 * | 1/2014 | Hata | F21K 9/64 | 362/235 |
| 2014/0078735 | A1 * | 3/2014 | Premysler | G02B 19/0061 | 362/373 |

FOREIGN PATENT DOCUMENTS

KR 101050278 B1 * 7/2011

* cited by examiner

*Primary Examiner* — Sean P Gramling

(57) ABSTRACT

An illuminating device can comprise two substrates each having two surfaces, one of each can be configured to mount solid-state lighting devices wherein the two substrates are separated by a defined gap. The two substrates are electrically and mechanically connected and can support or be supported with an enclosure such as an optic. This configuration provides thermal decoupling and uniform illumination when assembled as per the embodiments explained.

18 Claims, 5 Drawing Sheets

ILLUMINATING DEVICE

RELATED APPLICATIONS

This application is a continuation application of the U.S. patent application Ser. No. 15/860,629 filed on Jan. 2, 2018. The entire teachings of the above applications are incorporated herein by reference.

FIELD OF THE INVENTION

The present invention relates generally to SSL (solid-state lighting) fixtures and devices, particularly, to LED (Light Emitting Diode) bulbs and fixtures.

BACKGROUND

SSL fixtures refer to lighting fixtures that generate light using LEDs or other solid-state light emitters such as OLEDs (Organic Light Emitting Diodes). There is a growing interest in the use of SSL fixtures, lamps, bulbs, tubes and devices for a wide variety of applications due to their high energy efficiency as compared to traditional incandescent and fluorescent lighting. LED fixtures and bulbs commercially available now exhibit very high efficiency levels (75-150 lumens per watt), excellent color rendering properties, and lifetimes from 10-100,000 hours.

SSL fixtures include an integrated or external power conversion circuit (driver) that converts ac (alternating current) or dc (direct current) input power into a dc power suitable to drive the LEDs. LEDs also generate heat and so does the driver. Excessive operating temperatures can significantly reduce the lifetime of the SSL fixture and bulky and costly metal heat sinks are mostly employed to dissipate the heat. Further, the thermal coupling (proximity) of the LEDs and driver is not good for the reliability of either. As of this writing, a typical LED bulb has a driver cavity with metal walls and a top metal plate housing an LED board and a bottom metal Edison connector. As a result, the driver is almost totally enclosed by hot metal which is not conducive for reliability. This structure and that of the so-called filament LED bulb limits the lifetime and light output of the bulb. Further, wireless communication to enhance the control features of the bulb cannot be easily implemented within such structures.

DETAILED DESCRIPTION

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

The expression "lighting apparatus" or "illuminating device", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing ac incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

According to the invention, a solid-state lighting apparatus can include two substrates each having first and second opposing surfaces, where at least one of the opposing surfaces is configured to mount devices thereon. It will be understood that the substrate has an upper surface and a lower surface. According to the invention, the two substrates are spaced apart at a certain distance and are electrically connected. The term "substrate" and "board" may be used alternatively.

Figure 1:
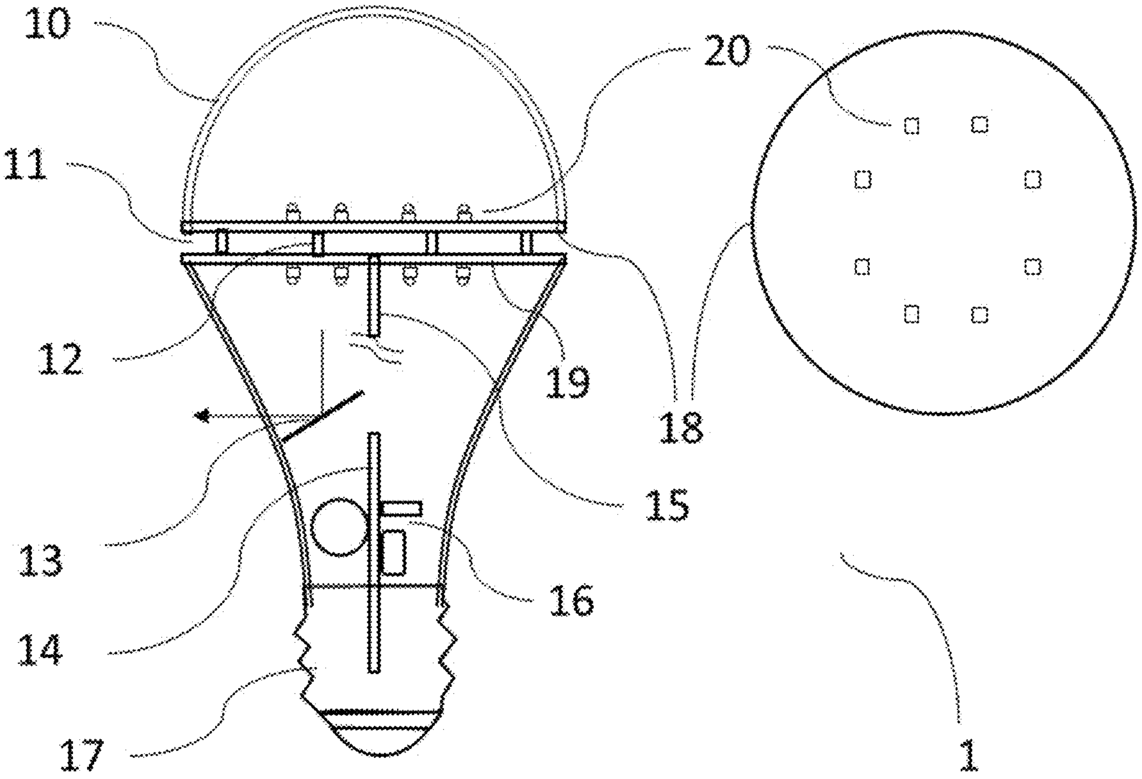
FIG. 1 is a drawing of a front sectional view of a bulb and the top view of one of the substrates.

FIG. 1 is a view of a bulb, an illuminating device, which is one embodiment of the invention. The bulb has a secondary optic 10, which could be glass, plastic, silicone or alike. This optic may have a top half and a bottom half which can be joined together with support structure like 12. The optic may also support or be supported on the printed circuit board (PCB) 18 and/or 19. The PCB 18 and 19 may have one or more light-emitting diodes (LEDs) 20 and electronic circuitry on board and will be electrically interconnected. The electrical connector/s may also serve as a mechanical support. Important feature of the invention is the air gap 11 between the PCBs 18 and 19 for air circulation and thus cooling. Another PCB 14 houses the driver or power supply circuitry 16 to power the LEDs. 15 may be an extension of 14 and together may support 18, 19 and 10. A cone or baffle 13 may be incorporated to reflect the light from the LEDs mounted on 19 to meet a desired light distribution. The base of the bulb may be an Edison screw base, bayonet or GU or alike. The advantage includes (a) getting rid of a metal heat-sink and thus lower cost, (b) decoupling LED heat from the driver hence longer reliability and (c) splitting LED (heat) load in two boards for thermal separation (allows higher luminosity bulbs) and optical uniformity.

According to FIG. 1, in some embodiments according to the invention, the substrates 18 and 19 can be a standard FR-4 PCB. The PCB can be formed of many different materials that can be arranged to provide the desired electrical isolation and high thermal conductivity. In some embodiments, the PCB can at least partially comprise a dielectric to provide the desired electrical isolation. In other embodiments according to the invention, the PCB can comprise ceramic such as alumina, aluminum nitride, silicon carbide, or a polymeric material such as polyimide and polyester etc.

In some embodiments the substrate can be made of glass. In some embodiments, the substrate can be optically opaque while in some embodiments it can be optically translucent or diffusive. In some embodiments according to the invention, the PCB can comprise highly reflective material, such as reflective ceramic or metal layers like silver, to enhance light extraction from the SSL component.

For boards 18 and/or 19 made of materials such a polyimides and polyesters, the boards can be flexible (sometimes referred to as a flexible PCBs). This can allow the board to take a non-planar or curved shape, with the LED chips also being arranged in a non-planar manner. In some embodiments according to the invention, the board can be a flexible printed substrate such as a Kapton® polyimide available from Dupont. This can assist in providing boards that emit the different light patterns, with the non-planar shape allowing for a less directional emission pattern. In some embodiments according to the invention, this arrangement can allow for more omnidirectional emission, such as in the 0-180° emission angles.

In some embodiments, the board 18 and/or 19 can include dielectric layers to provide electrical isolation in top direction, bottom direction or both. The dielectric layer may comprise electrically neutral materials that provide good thermal conductivity. Different dielectric materials can be used for the dielectric layer including epoxy based dielectrics, with different electrically neutral, thermally conductive materials dispersed within it. Many different materials can be used, including but not limited to alumina, aluminum nitride (AlN) boron nitride, diamond, etc. Different dielectric layers according to the present invention can provide different levels of electrical isolation with some embodiments providing electrical isolation to breakdown in the range of 100 to 5000 volts. In some embodiments, the dielectric layer can provide electrical isolation in the range of 1000 to 3000 volts. In still other embodiments, the dielectric layer can provide electrical isolation of approximately 2000 volts breakdown. In some embodiments according to the invention, the dielectric layer can provide different levels of thermal conductivity, with some having a thermal conductivity in the range of 1-40 W/m-K. In some embodiments, the dielectric layer can have a thermal conductivity greater than 10 W/m-K. In still other embodiments, the dielectric layer can have a thermal conductivity of approximately 3.5 W/m-K.

In some embodiments according to the invention, the substrates 18 and/or 19 may have discrete heat sinks that can be soldered or mounted on to the surface facing the gap 11 to increase thermal performance. In some embodiments and air movement device may be positioned in the gap 11.

In some embodiments according to the invention, the substrate 18 and/or 19 can be a metal core PCB (MCPCB), such as a "Thermal-Clad" (T-Clad) insulated substrate material, available from The Bergquist Company of Chanhassen, Minnesota. The T-Clad substrate may reduce thermal impedance and conduct heat more efficiently than standard circuit boards.

The size of the substrates 18 and/or 19 can vary depending on different factors, such as the size and number of the LEDs mounted thereon, the power rating and the application fixture. The two substrates 18 and 19 may be of different sizes and shapes. Although FIG. 1 shows the substrates 18 and 19 to be parallel to each other, they could be oriented at a certain angle to aid heat transfer. The substrates may form a tapering shape between them to aid convection.

Further, according to some embodiments, the power supply or driver 16 for the LEDs may be mounted on a PCB 14. The PCB may have an extension 15 leading up to the substrate 19 to make an electrical connection. The driver circuit may generally step up or step down the input voltage or a combination thereof. In some embodiments, the driver circuit may be based on a boost converter. The driver output may be single or multichannel. The output current may be tightly regulated, loosely regulated or unregulated.

The electrical connection in addition to delivering one or more forms of power may deliver to or receive signals from the boards 19 or 18. Different types of signals could include sensor feedback such as temperature, ambient light, occupancy or proximity or communication signals such as on/off or dimming control or audio in analog or digital form. The driver circuitry may be understood to perform, in addition to power processing, smart functions such as wireless communication, controls, sensing and metering.

In some embodiments, the substrate 18 or 19 may house an audio speaker diaphragm such that sound is emitted into the gap 11 and can propagate radially outward.

According to some embodiments, PCB 14 may be connected to the base 17 via spring contacts, soldered contacts, wires, pressure contact and alike. The base may take the form of an Edison screw base, bayonet, GU, pin base or alike. In some embodiments instead of a base the PCB 14 receives power input directly from the source, for example through wires. The input power source may be ac or dc. The input power voltage may be 120 V ac, 60 Hz but can have a wide range such as 90-240 V ac, 277 V ac or more than 300 V ac.

According to some embodiments the transparent or translucent or diffusive optic 10 may have a top section and a bottom section (not pointed out specifically in FIG. 1) that houses the driver. It is thus understood that the entire exterior outline of the shape of FIG. 1 is identified by 10 which is also referred to as the optic. Thus, according to some embodiments, the bottom optic may provide structural support to board 19. The optic 10 top or bottom half may take a non-spherical shape such as cylindrical, elliptical, conical or cubicle.

The LEDs mounted on the substrates 18 and 19 may be connected individually in a string or array pattern and then connected in series or parallel. In some embodiments, the current in the LEDs on each board may be controlled separately. The LEDs may emit white light or a light of any color such as red, green, blue, amber or alike. The aggregate color of light emitted from board 18 may differ from the light emitted from board 19.

According to some embodiments, a reflective or diffusive baffle 13 may be inserted above the driver 16 so that the light emitted from the LEDs mounted on the board 19 is reflected towards the exterior of the optic as shown by the arrow. In other embodiments, the baffle may be conical, hemispherical, pyramidal or any other shape to optimize the light distribution.

Further referring to FIG. 1, according to some embodiments, the structural support element 12 may connect the two substrates 18 and 19 electrically, mechanically or both. Alternately, boards may be electrically connected independent of the mechanical support by means of wires, headers, connectors and alike. There may be only one support located centrally or multiple supports distributed in the space 11.

Figure 2:
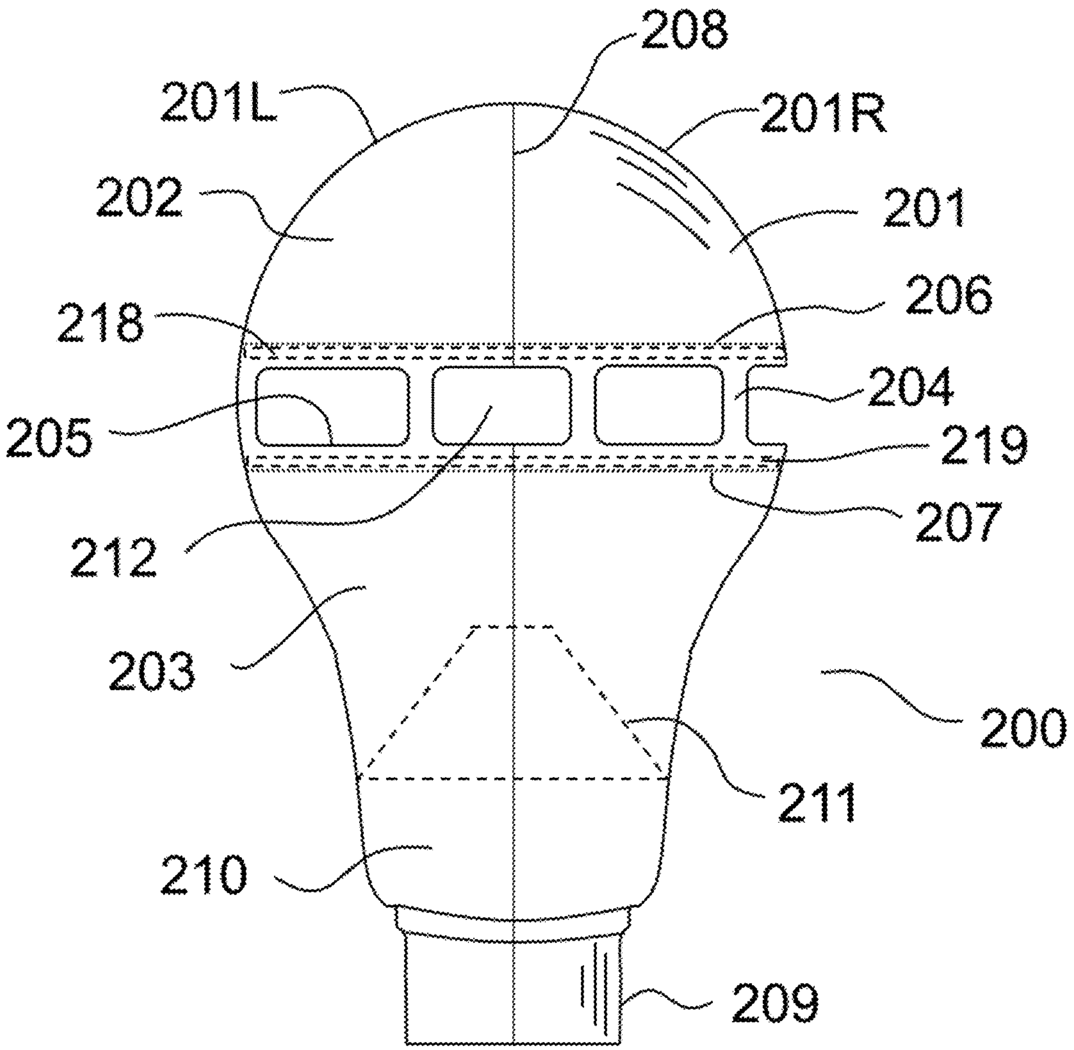
FIG. 2 is a drawing of a side/front view of another embodiment of the invention.

FIG. 2 shows another embodiment 200 of the invention preserving the core teaching of the two substrates separated by a gap. The optical enclosure 201 may be visualized in a shape like an A19 incandescent bulb and may comprise of two nearly identical halves 201L (left half) and 201R (right half) molded in a transparent or translucent plastic material that are joined together by methods such as snap fit, screws, gluing or ultrasonic welding at the seam shown by 208. A first optical chamber formed by the boundaries of the optics 201L and 201R and the substrate 218 is denoted by 202. A second optical chamber, 203, has boundaries partially defined by the substrate 219 and the optics 201L and 201R. A novel feature of the embodiment is the large window openings 205 in the material of the enclosure that allows for cross air circulation in the gap 212, which is substantially exposed to the ambient air outside the optical enclosure, to cool the substrates. The windows 205 may be of different shapes and sizes. The material in the space between the windows shown by 204 provides mechanical support and integrity. It will be pointed out that despite the large window openings, the human accessible portion of the boards or connections may be made safe to touch according to the stringent requirements of product safety agencies such as Underwriters Laboratories, by having insulating (dielectric) material layers on the substrate and connector assemblies.

This paragraph describes one method to manufacture or assemble the device of FIG. 2. The substrates 218 and 219 of FIG. 1, may rest or secured in/on the grooves or ridges 206 and 207 of FIG. 2 respectively. A unitary assembly of the substrates 18 and 19 as shown in 300 of FIG. 3 may be used instead. The driver may be secured near the base 209 in the driver cavity 210 in a similar fashion. The interconnects between the base cap, driver and the substrates and may be made with wires. A conical reflective insert 211 may be secured above the driver cavity. Once the boards are in place in for example in one half of the enclosure 201L, the other half 201R may be put over the sub-assembly and then joined together securely. The base cap such as Edison E26 cap can be then crimped around the base 209.

Figure 3:
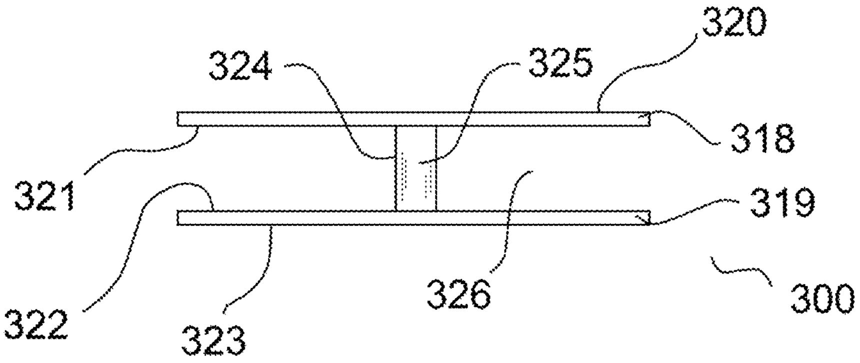
FIG. 3 is a drawing of two substrates separated by a gap.

According to some embodiments the two substrates 18 and 19 of FIG. 1 can be joined together to form a unitary assembly 300 as in FIG. 3. The assembly may be molded together with an electrically insulating but thermally conductive material. FIG. 3 shows the details such as an upper surface 320 and a lower surface 321 of the substrate 318. Similarly, the substrate 319 has an upper surface 322 and a lower surface 323. The two substrates are spaced apart by a gap 326. The length of the gap depends upon the overall size of the end application, the surface area and the amount of cooling needed. In one embodiment the two substrates may be supported by a cylindrical member 325 which may also house electrical connections between them. Alternately in another embodiment the drawing may be viewed as a member 324 and its similar counterpart providing two electrical connections and two mechanical supports.

Figure 4:
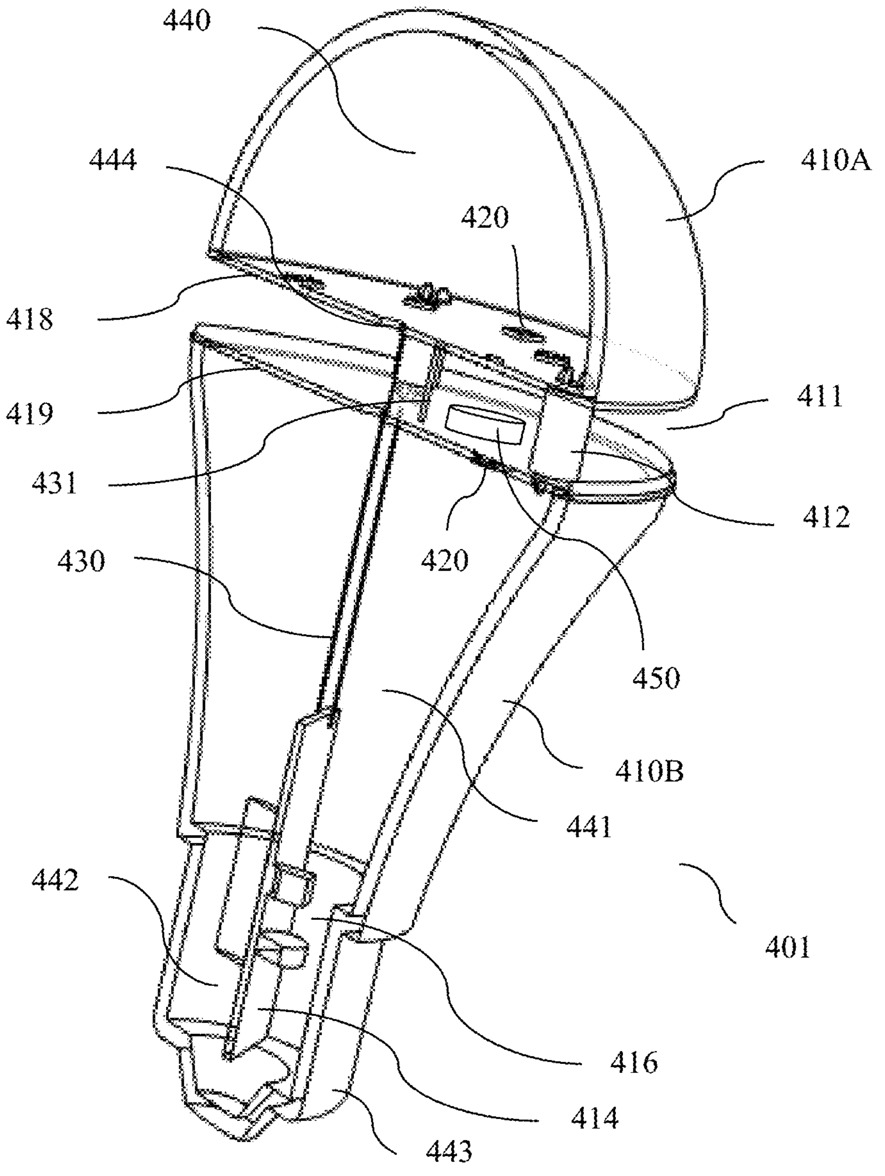
FIG. 4 is an isometric sectional view of an embodiment like that of FIG. 1.

FIG. 4 shows a slightly different embodiment 401 of FIG. 1 in a sectional perspective. FIG. 4 is numbered such that it is easy to correlate the likeness of different numbered elements to that of FIG. 1; for example, 411 to 11 or 418 to 18. An exception is that the optic 10 of FIG. 1 is now identified as two distinct parts where 410A is referred to as a first optic and 410B is referred to as a second optic. Additional numbered elements are described ahead. According to one embodiment, wires 430 may be used to connect power and signal between the driver and the substrate 419 and connectors 431 may be used to connect power and signal between substrate 419 and 418. The connectors 431 may be electrically insulated while the wires 430 may be bare. The substrates may have additional holes such as 444 to increase air circulation between the spaces 440 and 411 or between the spaces 441 and 411. The space 411 is alternatively referred to as the gap which is completely open to the ambient air along the perimeter. The space 440 is alternatively referred to as a first optical chamber. The space 441 is alternatively referred to as a second optical chamber. In addition, the optical enclosure 410B may have vent holes near the surface surrounding the driver. 412 may be a snap-fit standoff/support as shown. In some embodiments, the driver may not protrude in space 441 and may be entirely enclosed in the space 442 below the rim of the section 443 which houses a connector such as an E26 Edison shell that is well known in the art. The driver may be potted with a white potting compound sufficient to reflect incident light. In some embodiments as in 211 of FIG. 2 a reflective cone may be placed in the space 441 around the driver. 450 may represent an air movement device or an audio device or a sensor as indicated elsewhere in the specification.

Figure 5:
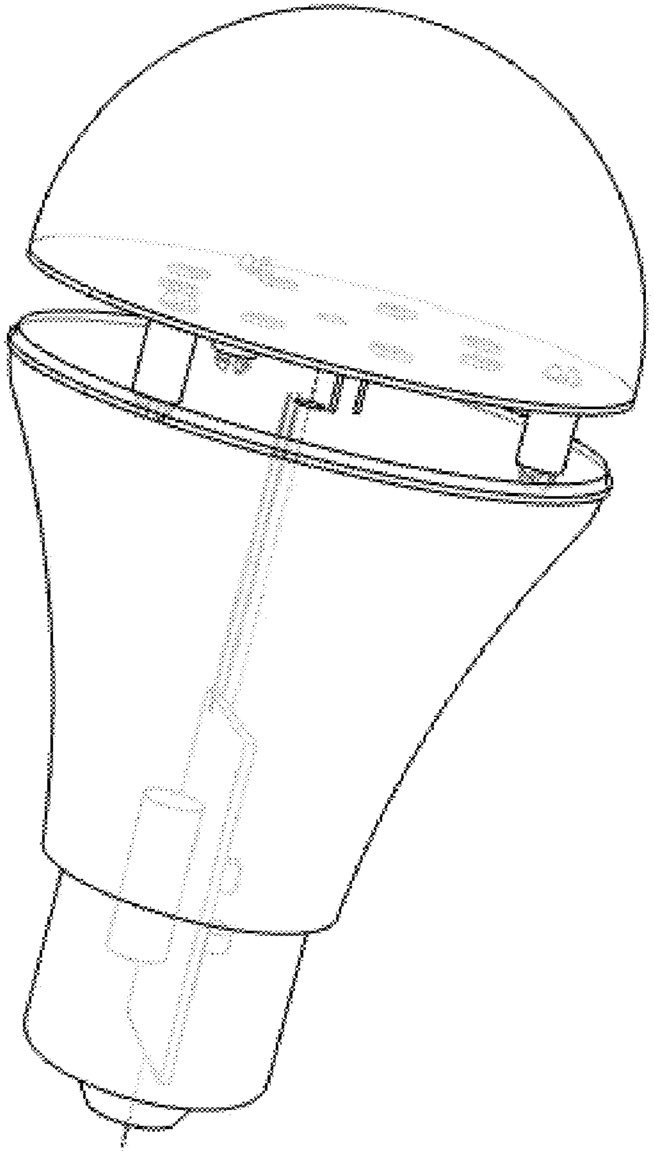
FIG. 5 is a drawing of the isometric view of the assembly of FIG. 4.

FIG. 5 is an isometric view of the complete illuminating device of FIG. 4. It can be understood that mounting of such a device horizontally in an application, such as a standard vanity fixture bar, such that the substrates are oriented vertically may provide the best thermal performance as the hot air in the gap between the substrates rises and establishes natural air convection.

Figure 6:
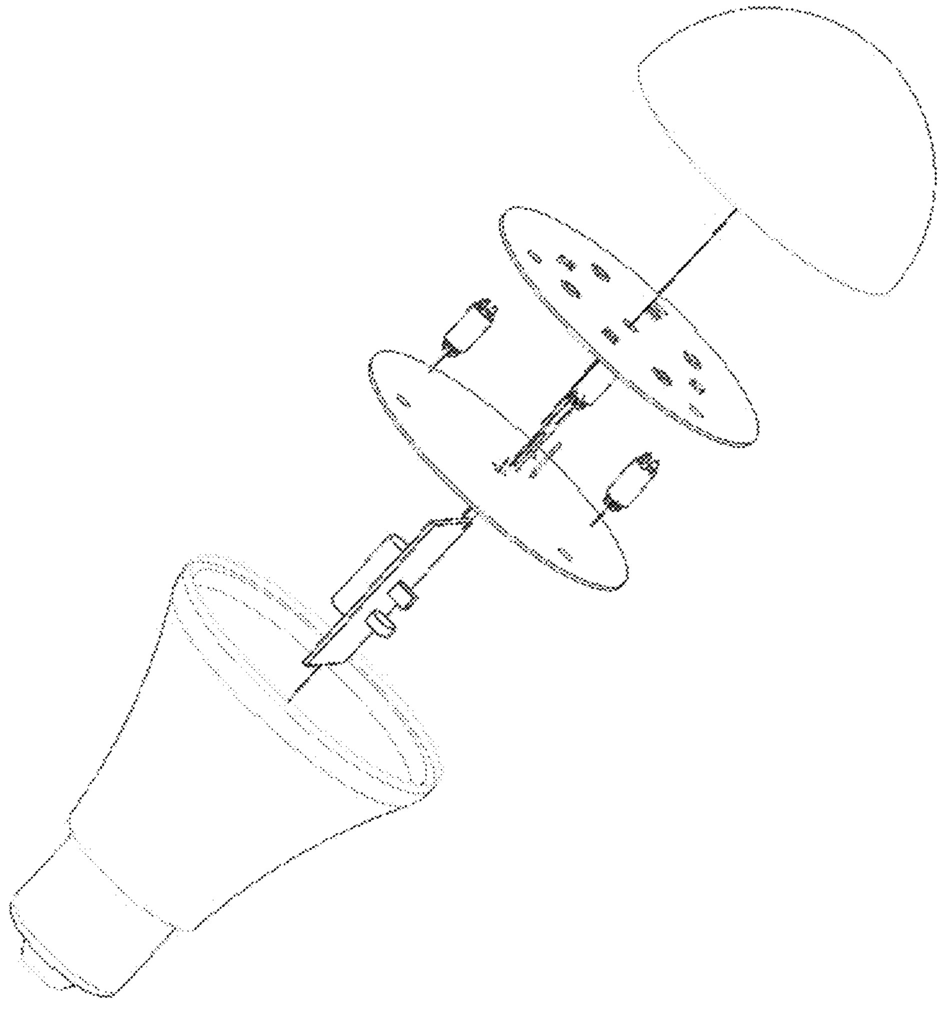
FIG. 6 is a drawing of the exploded view of the assembly of FIG. 4.

FIG. 6 is an exploded view of the assembly of FIG. 4 (visualized from lower left to upper right). According to one example method of assembly, the driver may be first secured in the lower housing/optic 410 followed by a connection between the driver and the substrate 419. The substrate 419 may be then secured to the housing. This may be followed by insertion of the supports 412 and the connectors 431. The substrate 418 may be snapped on to the upper housing/optic 410 or vice versa and then snapped into the supports while simultaneously making the electrical connection. It will be understood that such and other assembly methods are not intended to limit the scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

It will be understood that, as used herein, the term light emitting diode may include a light emitting diode, laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive layers.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The invention claimed is:

1. A method of providing illumination, comprising:

(a) providing a first substrate mounted with a first set of solid-state light emitters, (b) providing a second substrate mounted with a second set of solid-state light emitters, (c) spacing said substrates apart by a predetermined gap, (d) exposing said substrates to ambient air only via said gap completely along the perimeter of said substrates, (e) providing electrical power to drive said light emitters, (f) orienting said substrates such that the light emanating from said first light emitters is in substantially opposite direction to the light emanating from said second light emitters, and (g) diffusing the light emitted by said first and second sets of light emitters, whereby, said substrates are cooled by ambient cross air circulation in the said gap.

2. The method of claim 1 wherein said substrates are polygonal in shape.

3. The method of claim 1 wherein said substrates are oriented vertically for maximum air convection in said gap.

4. The method of claim 1 wherein said electrical power is direct current.

5. The method of claim 1 wherein color of light emitted by said first emitters is different than the color of light emitted by said second emitters.

6. The method of claim 1 wherein light from said emitters is diffused by secondary optics.

7. An assembly method of a solid-state lighting apparatus comprising:

(a) securing a driver PCB inside a first optical chamber that is partially bounded by a first light-transmitting optic, (b) securing a first substrate, mounted with a first set of light emitters, on to said first optic, (c) securing a support structure to said first substrate, (d) securing a second substrate, mounted with a second set of light emitters, on to said support structure such that the first and second substrates are spaced apart by a gap exposed to the ambient air (e) securing a second light-transmitting optic to said second substrate, (f) securing an electrical supply connector to said first optic, and (g) providing means of electrical connections between said connector, said driver PCB and said substrates.

8. Method of claim 7 wherein said substrates and said support structure constitute a unitary assembly secured to said optics.

9. Method of claim 7 wherein said optics are configured to have diffusive properties.

10. Method of claim 7 wherein securing said optics and said substrates involves snap fit technique.

11. Method of claim 7 wherein a reflective insert is secured inside said first optic.

12. Method of claim 7 wherein securing said optics and said substrates involves gluing.

13. A solid-state lighting unitary assembly comprising:

a first substrate having an upper surface and a lower surface that is opposite the upper surface, the upper surface configured to mount at least a first solid-state light emitting device thereon;

a second substrate having an upper surface, and a lower surface that is opposite the upper surface and configured to mount at least a second solid-state light emitting device thereon;

said substrates spaced apart by a predetermined uniform gap exposed to the ambient air;

said gap configured to be completely open to the ambient air along the perimeter defined by said substrates; and mechanical supports that provide electrical connections between said substrates; whereby, said second substrate supports said first substrate in conjunction with said supports, and the combination of light produced by electrically powering said light-emitting devices makes up all light produced by said assembly.

14. Assembly of claim 13 further comprising an electrically insulating but thermally conductive material.

15. Assembly of claim 13, wherein said substrates are spaced apart by a gap of at least 1 mm.

16. Assembly of claim 13, wherein said supports are cylindrical.

17. Assembly of claim 13, wherein said first and second light emitters emit different colors.

18. Assembly of claim 13, wherein said supports connect said substrates with snap-fit technology.

* * * * *